(12) United States Patent
Huang et al.

(10) Patent No.: US 7,617,914 B1
(45) Date of Patent: Nov. 17, 2009

(54) LIGHTWEIGHT BRAKE DRUM WITH CENTERLINE SQUEALER BAND

(75) Inventors: Sik-Kan Huang, Albertsville, AL (US); Christopher G. Ramsden, Hartselle, AL (US)

(73) Assignee: Webb Wheel Products, Inc., Cullman, AL (US)

( * ) Notice: Subject to any disclaimer, the term of this patent is extended or adjusted under 35 U.S.C. 154(b) by 527 days.

(21) Appl. No.: 11/530,721

(22) Filed: Sep. 11, 2006

(51) Int. Cl.
*F16D 65/38* (2006.01)

(52) U.S. Cl. .............................. 188/73.37; 188/264 AA; 188/264 R

(58) Field of Classification Search .............. 188/73.37, 188/218 R, 218 A, 18 R, 218 XL, 17, 264 R, 188/264 A, 264 AA, 250 E; 192/113.1, 113.2, 192/113.21, 113.22, 113.23
See application file for complete search history.

(56) References Cited

U.S. PATENT DOCUMENTS

| 4,674,606 | A | * | 6/1987 | Denton | 188/264 R |
|---|---|---|---|---|---|
| 5,285,874 | A | * | 2/1994 | Revyn | 188/218 R |
| 5,320,201 | A | * | 6/1994 | White | 188/264 A |
| 5,390,769 | A | * | 2/1995 | Bair et al. | 188/218 R |
| 5,538,113 | A | * | 7/1996 | White et al. | 188/218 R |
| 5,664,648 | A | * | 9/1997 | Hester | 188/218 R |
| 6,196,363 | B1 | * | 3/2001 | Wall | 188/218 R |
| 6,241,056 | B1 | * | 6/2001 | Cullen et al. | 188/218 R |
| 6,666,309 | B2 | * | 12/2003 | Brotherton et al. | 188/218 R |

* cited by examiner

*Primary Examiner*—Pam Rodriguez
(74) *Attorney, Agent, or Firm*—DLA Piper LLP US; R. Blake Johnston

(57) ABSTRACT

A brake drum that converts kinetic and potential energy into frictional heat without developing destructively high temperatures and provides such performance at a reduced weight with an increase in cooling effectiveness through the use of a squealer band positioned on the centerline of the drum braking surface along with axial cooling fins radiating therefrom and windows on the wraparound portion abutting mounting face.

10 Claims, 3 Drawing Sheets

LIGHTWEIGHT BRAKE DRUM WITH CENTERLINE SQUEALER BAND

BACKGROUND OF THE INVENTION

1. Field of Invention

The present invention is related to brake drums, and more particularly brake drums for heavy-duty vehicles having reduced weight without the loss of required braking performance and drum integrity.

2. Background

Like most components for heavy-duty vehicles such as trucks and buses, users desire the lowest amount of weight while obtaining the highest amount of performance. A standard full cast brake drum weight approximately 112 pounds. Unfortunately, prior art brake drums can only be lightened so much before performance suffers, particularly due to heat fatigue caused by braking. Further, to achieve the maximum amount of weight reduction in prior art drums, one must use a premium alloyed iron, thus increasing costs.

Two such examples of prior art attempts to lighten drums but maintain performance are the ArvinMeritor SteelLite X30™ (94 pounds) and the Hayes Lemmerz CentriFuse® (90 pounds). Gray iron is centrifugally cast in a steel shell to provide resistance to heat cracks and breakage problems. However, steel shell drums have brake noise issues and braking heat absorption and dissipation are poor due to the lower volume of gray iron and low heat conduction of the steel shell.

Another prior art attempt is the Gunite Gold drum (94 pounds). High Molybdenum content (>0.6%) and other alloys provide strength at higher braking temperatures. However, dynamometer tests show longer drum life at the expense of a higher tendency of braking fade with much lower deceleration at or above 60 miles per hour.

It is therefore a goal of manufacturers and users of brake drums for heavy duty vehicles to provide a lower drum weight while maximizing the safe and effective operation of the drum. It is further goal to minimize metal fatigue and brake fade based on the temperature of the drum while in use.

SUMMARY OF INVENTION

The inventive brake drum converts kinetic and potential energy into frictional heat without developing destructively high temperatures and provides such performance at a reduced weight with an increase in cooling effectiveness. The inventive drum obtains such performance using a squealer band positioned on the centerline of the drum braking surface along with axial cooling fins radiating therefrom and the use of windows near the mounting face.

BRIEF DESCRIPTION OF THE DRAWINGS

Specific embodiments of the invention have been chosen for purposes of illustration and description, and are shown in the accompanying drawings, forming a part of the specification wherein.

DETAILED DESCRIPTION OF THE PREFERRED EMBODIMENTS

Figure 1:
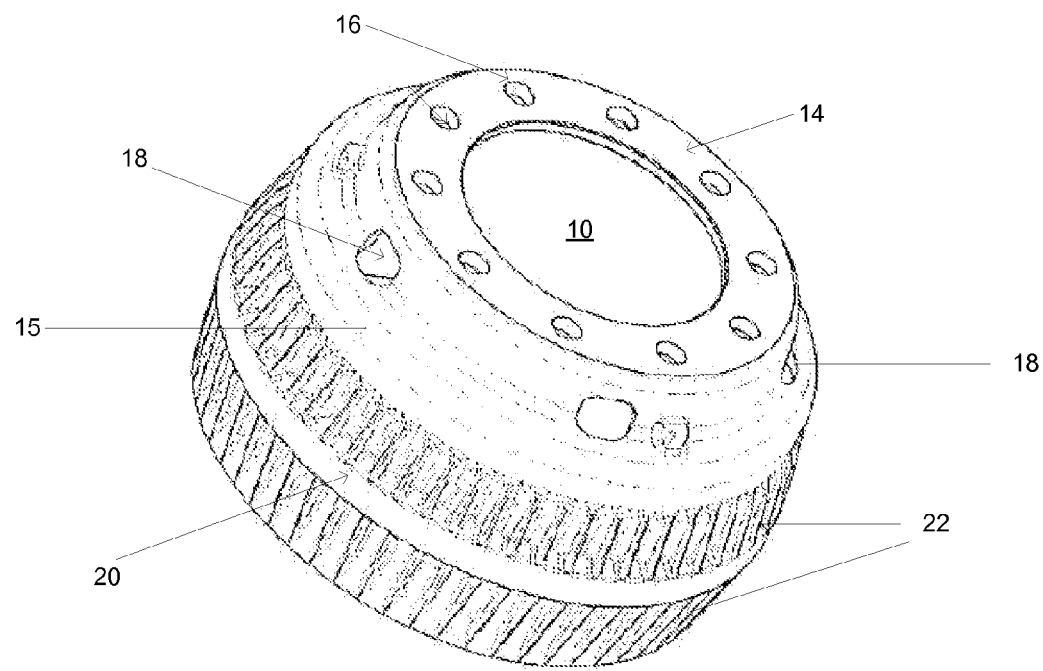
FIG. 1 is an outboard perspective view of the brake drum according to the invention.
Figure 2:
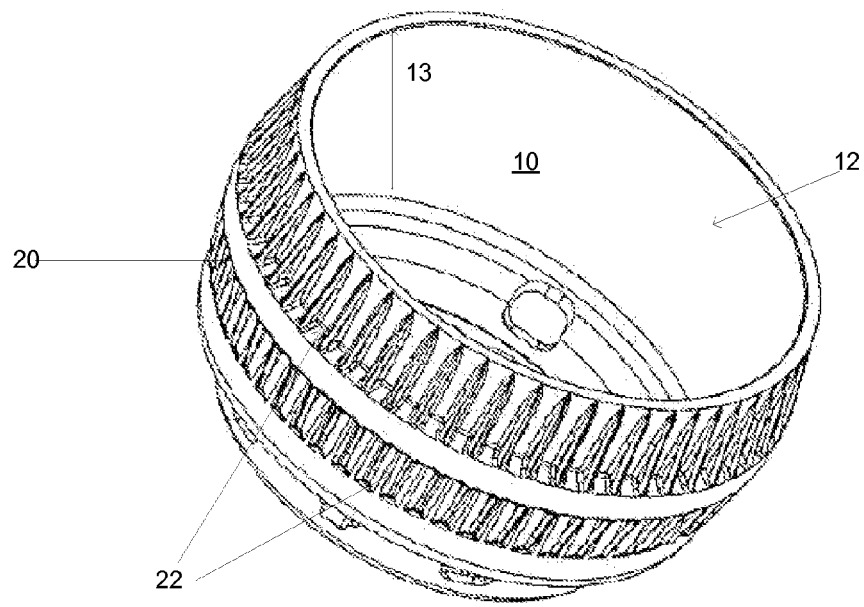
FIG. 2 is an inboard perspective view of the brake drum according to the invention.
Figure 3:
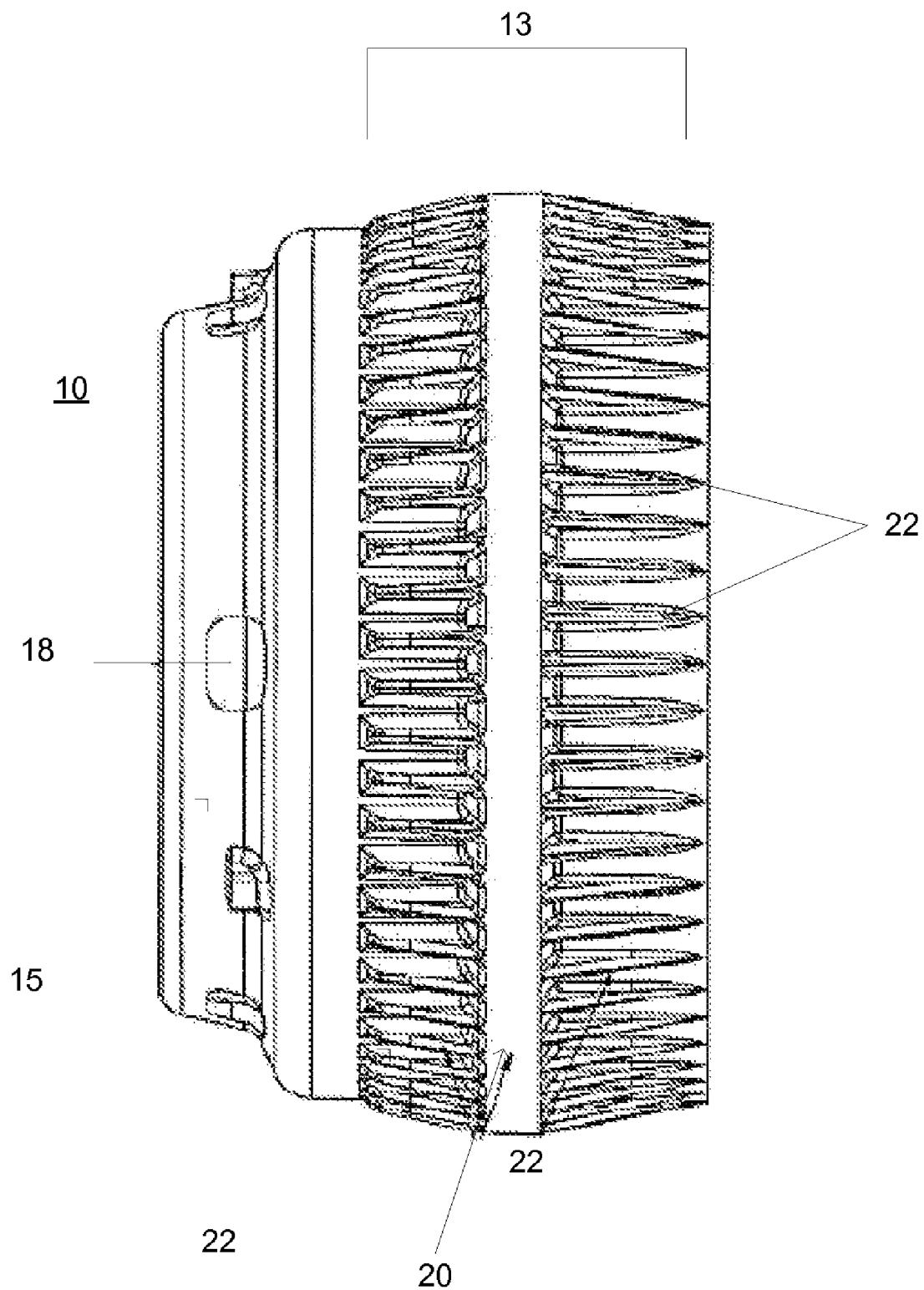
FIG. 3 is side elevational view of the brake drum according to the invention.
Figure 4:
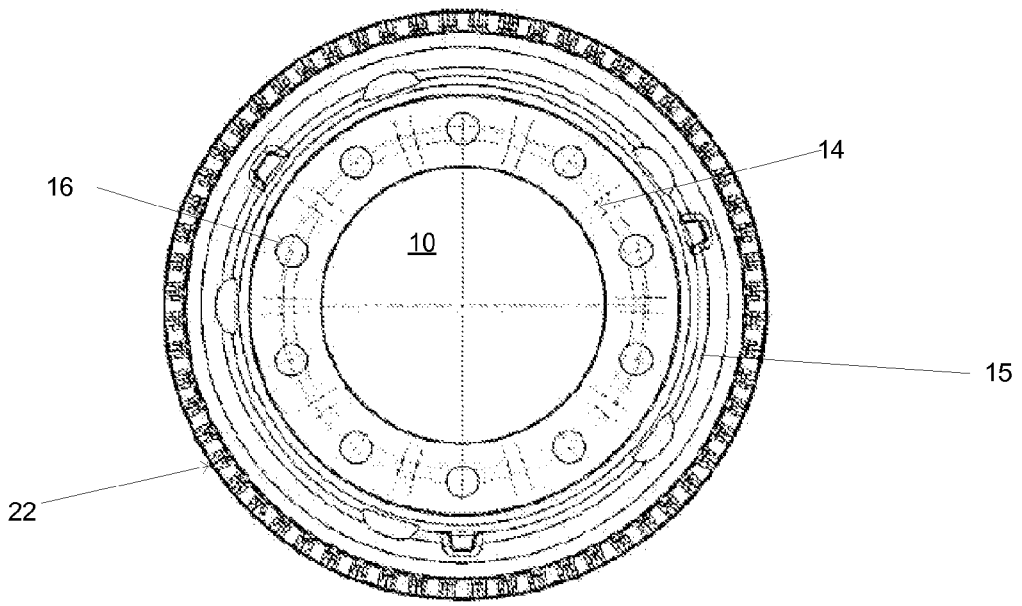
FIG. 4 is an outboard plan view of the brake drum according to the invention.
Figure 5:
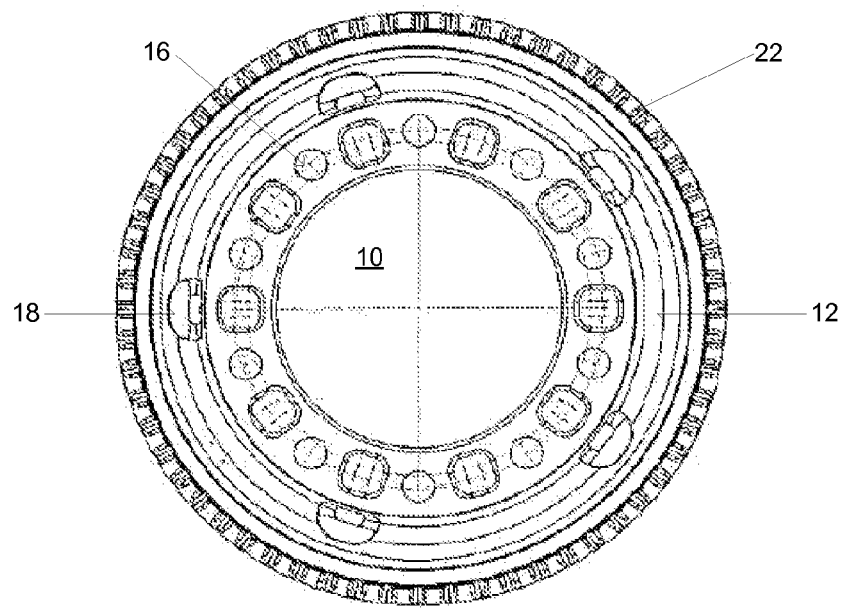
FIG. 5 is an inboard plan view of the brake drum according to the invention.

The drum 10 of the instant invention is generally characterized by the braking surface 12, mounting face 14 and wraparound portion 15 therebetween. The braking surface has a width 13 that is measured from the open end of the drum to the beginning of the wraparound portion 15. Mounting face 14 further contains a plurality of mounting apertures 16 for mounting the brake drum 10. As can best be seen in FIGS. 1 and 3, the wraparound surface 15 of the drum 10 contains a plurality of cut-outs or windows 18 and joins the mounting face 14 to the main body portion of the drum 10 that primarily forms the braking surface 12.

The main body of the drum 10 is characterized by a squealer band 20 that approximately circumscribes the centerline of the braking surface 12 of the drum 10. It should be noted that in another embodiment of invention, the positioning of centerline squealer band 20 may be off on either side of the exact centerline of the braking surface 12 by an amount equal to or less than 10% of the braking surface 12 width 13, without affecting performance of the inventive drum 10. On either side of the squealer band are a plurality of axial fins or ribs 22. In one embodiment of the invention, the axial fins 22 on opposing sides of the squealer band 20 alternate in pattern such that a fin on one side of the band is met with a gap on the other side of the band, rather than an opposing fin. In another embodiment, there are opposing fins on either side of the squealer band. As further described herein, the use of the central squealer band 20 and the axial fins 22 are important components of the inventive drum.

Typically, when a squealer band is used on a brake drum, it is located at the mouth end of the drum. One reason for a squealer band at the mouth of the drum is to prevent cracks starting from the mouth. A centerline squealer band goes against this concept. The centerline squealer band 20 is approximately centered on the braking surface 12 approximately with the brake shoe (when mounted, not shown) center loading line. Such positioning provides for a balanced and strengthened s-cam push-out force and braking torque and a more direct heat sink. While braking force generally is supposed to be evenly distributed along the braking surface of a drum, the point of origin for the force could still be higher. It should be further noted that the inventive brake drum 10 has its greatest thickness at the centerline squealer band 20. The use of an increased thickness, at the squealer band, helps strengthen against such push-out forces. Stress and thermal Finite Element Analysis testing confirmed such advantages. Further, the weight of the entire drum is lighter than a uniform thickness drum that is greatly thicker overall.

The axial fins 22 allow for enhanced external cooling of the drum 10. The use of such fins, particularly in greater number and depth and on either side of the squealer band 20 enhances braking cooling due to the increased external surface area. Increased surface area in turn allows convection to take place at a higher rate so that heat is dissipated more quickly. The windows 18 allow for enhanced brake surface 12 cooling in operation by increasing the rates of convection through increased airflow.

Through the use of the aforementioned features, the total wall thickness and thus weight of inventive brake drum can be reduced without the loss of convection across the brake drum. The inventors have found a reduction of approximately 14.5 pounds from prior art brake drums when standard grey iron (35 ksi tensile strength) is used. The use of less alloyed iron also reduces the cost of the drum.

In summary, the inventive drum 10 provides the following advantages, among others:

Balanced braking: S-cam push out force exerts more evenly on the centerline squealer band. Conventional squealer bands crack unevenly on one side from the heat check crack on the braking face.

Weight reduction: The centered squealer band provides weight reduction without unacceptable brake fade at or above 60 miles per hour.

In addition to the structures, sequences, and uses immediately described above, it will be apparent to those skilled in the art that other modifications and variations can be made to the method of the instant invention without diverging from the scope, spirit, or teaching of the invention. Therefore, it is the intention of the inventors that the description of instant invention should be considered illustrative and the invention is to be limited only as specified in the claims and equivalents thereto.

The invention claimed is:

1. A brake drum having a braking surface having a centerline and a circumference comprising:
    a squealer band positioned approximately on the centerline of the braking surface and encircling the circumference of said braking surface, said squealer band having a first side and an opposing second side; and
    a plurality of axial fins extending from each of the first and second sides of the squealer band.

2. The brake drum of claim 1 wherein said axial fins extend from the first and second sides of the squealer band in an alternating pattern.

3. The brake drum of claim 1 wherein the brake drum further includes a mounting face portion and a wraparound portion between said mounting face portion and said braking surface, further comprising a plurality of windows located on said wraparound portion.

4. The brake drum of claim 1 wherein the brake drum braking surface has a first thickness and the centerline squealer band has a second thickness greater than the first thickness.

5. The brake drum of claim 1 wherein the brake drum further includes an open end, a mounting face portion and a wraparound portion positioned between said mounting face portion and said braking surface, said axial fins generally extending between the first side of the squealer band and the wraparound portion and between the second side of the squealer band and the open end of the brake drum.

6. A brake drum for a vehicle braking system having a brake shoe, the brake drum comprising:
    a main body defining a braking surface having a centerline;
    a squealer band circumscribing the main body and positioned approximately in radial alignment with the centerline of the braking surface and a portion of the braking surface adapted to be engaged by the brake shoe of the vehicle braking system, said squealer band having a first side and an opposing second side; and
    a plurality of axial fins extending from each of the first and second sides of the squealer band.

7. The brake drum of claim 6 wherein said axial fins extend from the first and second sides of the squealer band in an alternating pattern.

8. The brake drum of claim 6 wherein the brake drum further includes a mounting face portion and a wraparound portion between said mounting face portion and said braking surface, further comprising a plurality of windows located on said wraparound portion.

9. The brake drum of claim 6 wherein the brake drum braking surface has a first thickness and the centerline squealer band has a second thickness greater than the first thickness.

10. The brake drum of claim 6 wherein the brake drum further includes an open end, a mounting face portion and a wraparound portion positioned between said mounting face portion and said braking surface, said axial fins generally extending between the first side of the squealer band and the wraparound portion and between the second side of the squealer band and the open end of the brake drum.

* * * * *